United States Patent [19]
Heaney et al.

[11] Patent Number: 4,517,046
[45] Date of Patent: May 14, 1985

[54] DEVICE FOR MAKING GROOVES IN CIGARETTE FILTERS

[75] Inventors: Richard Heaney, Campbell; Erik I. Naslund, Los Gatos, both of Calif.

[73] Assignee: Brown & Williamson Tobacco Corporation, Louisville, Ky.

[21] Appl. No.: 631,963

[22] Filed: Jul. 18, 1984

[51] Int. Cl.³ .......................... B29C 17/00; A24C 5/50

[52] U.S. Cl. .................................... 156/500; 156/219; 264/293; 425/385; 425/392; 493/43

[58] Field of Search ............... 156/209, 219, 220, 441, 156/500, 553; 493/42, 43; 264/284, 293; 425/383, 385, 392; 101/4-6, 8, 11, 22-25, 36-37

[56] References Cited

U.S. PATENT DOCUMENTS

| | | | |
|---|---|---|---|
| 4,292,032 | 9/1981 | Luke | 493/43 |
| 4,324,540 | 4/1982 | Sexstone et al. | 493/43 X |
| 4,436,517 | 3/1984 | Lebet | 493/43 X |

*Primary Examiner*—David Simmons
*Attorney, Agent, or Firm*—Charles G. Lamb

[57] ABSTRACT

An apparatus for sequentially forming a plurality of generally longitudinally extending grooves in the peripheral surface of a filter rod includes a rotatable drum having a plurality of filter rod receiving channels formed in its outer peripheral surface for receiving filter rods to be grooved. The device includes filter rod indexing devices which engage the filter rods in the receiving channels. As the drum rotates about its central axis, the filter rod indexing devices are individually and selectively activated to incrementally rotate selected filter rods about their longitudinal axes through an angle corresponding to the angular spacing between adjacent grooves to be formed in the peripheral surface of the filter rod. A plurality of groove forming rollers are located at selected positions at the periphery of the drum. The rollers each have a plurality of groove forming blades projecting radially outwardly therefrom. A groove forming blade in sequentially positioned rollers sequentially form a groove in the filter rod after the filter rod has been rotated about its longitudinal axes from the position of a previously formed groove by the filter rod indexing device.

21 Claims, 6 Drawing Figures

DEVICE FOR MAKING GROOVES IN CIGARETTE FILTERS

BACKGROUND OF THE INVENTION

1. Field of the Invention

The present invention relates to the manufacture of filters for cigarettes and more particularly to the making of grooves in cigarette filters.

2. Description of the Prior Art

Cigarettes are often provided with filter devices at one end to remove materials from the smoke stream coming from the tobacco column during smoking. These filters, which are attached to the tobacco column, come in many different sizes, shapes and forms. Some filters which are presently on the market include grooves. In some filter constructions the grooves facilitate the by-passing of smoke around the filter. In other filter constructions the grooves provide a channel for mixing ventilating air and by-passed smoke. In still other constructions the grooves provide a path for only ventilating air to pass therealong without mixing with smoke.

In the manufacture of grooved cigarette filters, many suggestions have been made for making the grooves in the filter rod. U.S. Pat. No. 3,804,695 shows the use of a pair of parallel rollers in pressure engagement defining a nip therebetween wherein one of the rollers is provided with a circumferential or a helical grooved surface so that, as a filter rod passes therethrough, permanent depressions are made along the longitudinal dimensions of the filter rod. U.S. Pat. No. 4,075,936 shows a die having cam manipulated radially reciprocating pins that periodically move into and out of the longitudinal path of a filter rod as the filter rod tow moves past. When the pins extend into the path of the tow they impress grooves in the filter rod. U.S. Pat. No. 4,149,546 shows an apparatus for making grooves in a cigarette filter wherein a filter rod is moved in an arcuate path transverse to a heated forming means, the filter rod being supported and conveyed for relative movement at the periphery of a drum-shaped inner rotor and the forming means compresses a heated arcuate outer strator element or elements projecting inwardly toward the rotor. U.S. Pat. No. 4,324,540 teaches an apparatus for making grooves in filters which comprises a plurality of fixed position groove forming blades and a filter plug conveying device located next to the groove forming blades. Cigarette filters to be grooved are moved along the path between the conveyor device and blades, rolling past the blades whereupon grooves are formed in the filters by the blades.

SUMMARY OF THE INVENTION

The present invention provides an apparatus for making grooves in cigarette filter rods. The present invention further provides a device for concurrently forming a plurality of elongated grooves in the peripheral surface of a filter rod.

More particularly, the present invention provides an apparatus for making elongated grooves in the peripheral surface of a filter rod comprising a generally cylindrical, rotatable drum, means defining a plurality of filter rod receiving channels in the outer peripheral surface of the drum spaced apart about the perimeter of the drum, means for selectively indexing each of the filter rods in the channels through predetermined angle of rotation about the longitudinal axis of the filter rod; and means for forming at least one longitudinal groove in each of the filter rods in the channels as the drum continuously rotates.

BRIEF DESCRIPTION OF THE DRAWINGS

A more complete understanding of the present invention will be obtained upon reference to the following description in conjunction with the accompanying drawings in which like numerals refer to like parts and wherein.

DESCRIPTION OF THE PREFERRED EMBODIMENT

Figure 1:
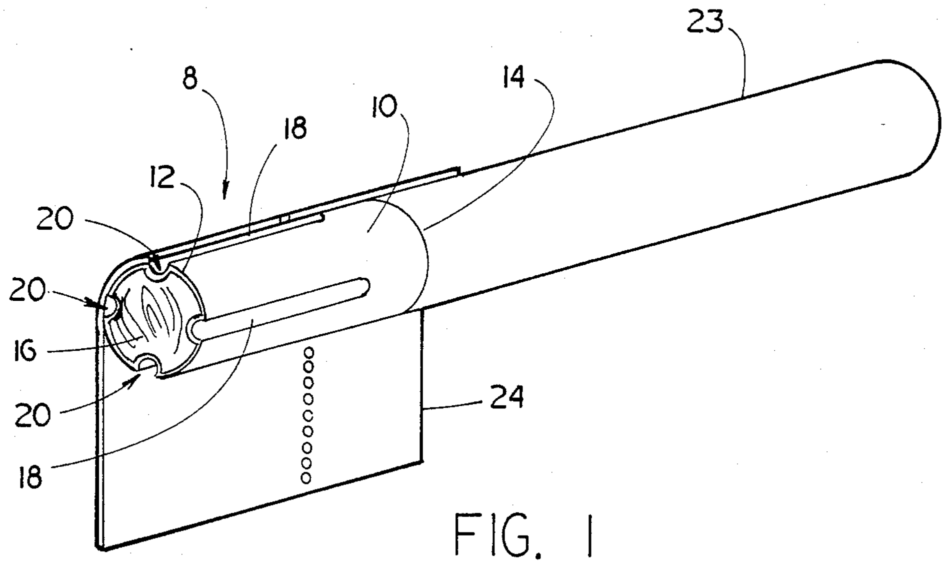
FIG. 1 is a perspective view of a cigarette having a filter rod attached thereto, the apparatus of the present invention being capable of manufacturing the filter rod.

Novel cigarette filters 8 of the type illustrated in FIG. 1 comprise a generally cylindrically shaped filter rod 10 fabricated of an air and smoke permeable material and a circumscribing wrapper 12 of an air and smoke impermeable material. The wrapper 12 extends longitudinally of the filter rod 10 from one end 14 of the filter rod to the other end 16 thereof so that the filter rod ends 14 and 16 are in mutual flowthrough relationship. The filter 8 includes a plurality of grooves 18 formed in the wrapper 12 and embedded into the filter rod 10. Each of the grooves 18 is open, as designated by the number 20, at the mouth end 16 of the filter rod 10 and extends therefrom in a generally longitudinal direction of the filter rod 10 for a distance less than the length of the filter rod 10. The grooves 18 are illustrated as being four in number, and equally spaced from each other about the circumference of the filter rod 10. The filter rod 10 is attached to a tobacco column 23 by means of an air permeable tipping material 24 which circumscribes the filter rod and overlaps a portion of the tobacco column in a manner known in the art to form a filtered cigarette. The tipping material 24 is formed with perforations to allow ambient air to flow into the grooves 18. In FIG. 1, the tipping material is shown in a partially unwrapped position to more clearly show details of the wrapped filter rod.

Figure 2:
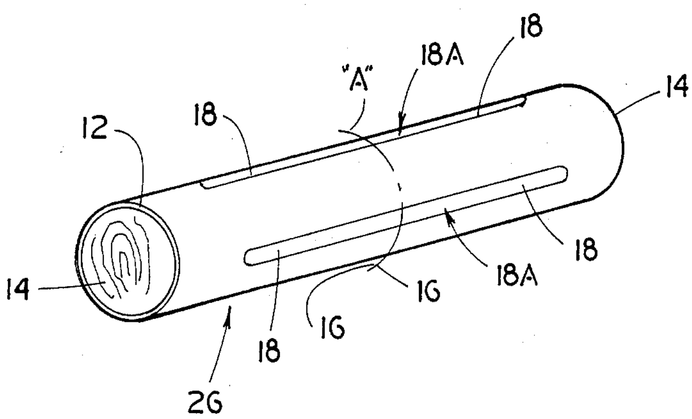
FIG. 2 is a perspective view of a filter tow from which the representative filter rod of FIG. 1 is made, and which the apparatus of the present invention is capable of manufacturing.

Now with reference to FIG. 2, as a manufacturing expedient, individual filter rods 10 are manufactured from a filter tow 26. The filter tow 26 is of a generally cylindrical shape and is as long as a preselected number of filter rods 10. The filter tow 26 is formed with longitudinally extending grooves 18A, each of which is twice as long as a groove 18 in the filter rod 10. The filter tow 26 is severed, generally transversely to the longitudinal centerline of the filter tow 26, at intervals corresponding to the desired filter rod 10 length, into individual filter rods 10. As illustrated, the filter tow 26 is severed at a location (denoted by the dashed line "A")

at the transverse centerline of the double length grooves 18A. The illustrated filter tow 26 is twice as long as an individual filter rod 10. Thus, in the illustration of FIG. 2, two individual filter rods 10 are produced by severing the filter tow 26 at the dashed line "A".

Figure 3:
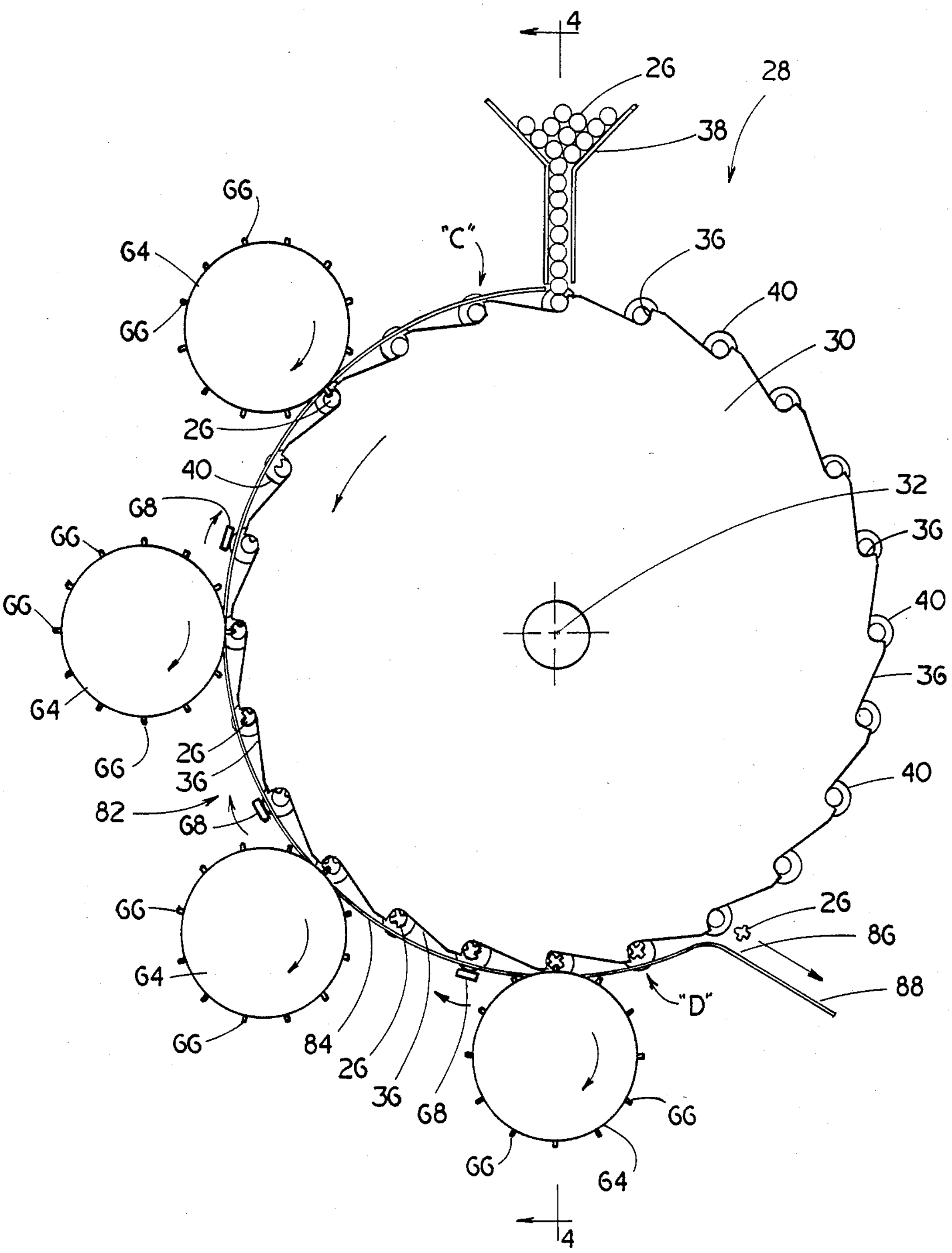
FIG. 3 is a sectional front view of an apparatus embodying the present invention as viewed in the direction of arrows 3—3 in FIG. 4.
Figure 4:
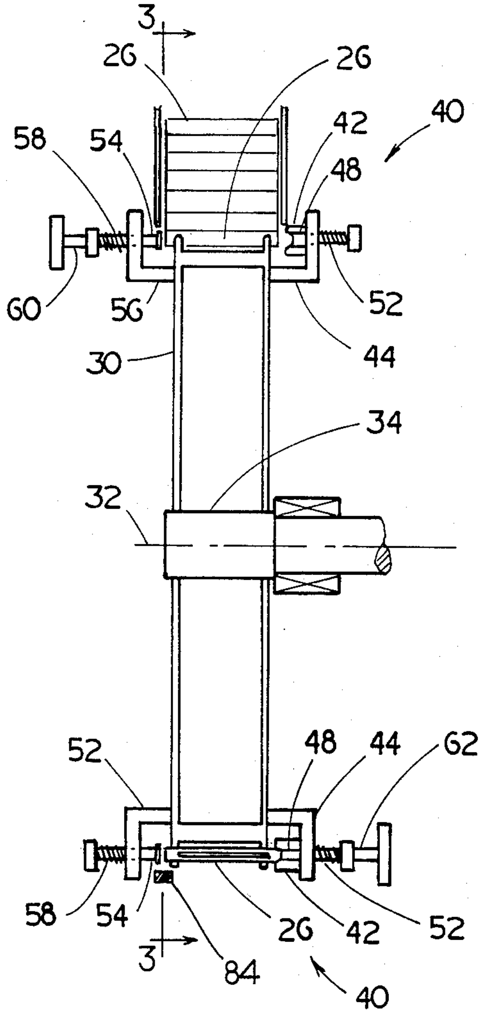
FIG. 4 is a sectional side view of the apparatus of FIG. 3 as viewed in the direction of arrows 4—4 in FIG. 3.

FIGS. 3 and 4 show a device, generally denoted as the numeral 28, for making the grooves 18 in the filter rod 10 of FIG. 1. For the reasons mentioned above, and as a further manufacturing expedient, the device 28 is adapted to form a plurality double length grooves 18A in a filter rod tow 26 at one time in order to obtain a high rate of production. Therefore, the following discussion will speak to forming double length grooves 18A in the filter tows 26, but it should be clearly understood that the apparatus 28 could be just as readily used to form grooves 18 in individual filter rods 10 essentially without modification.

Referring to FIGS. 3 and 4, the groove making apparatus 28 comprises a generally cylindrical drum 30 adapted for continuous rotation about its central axis 32. As shown, the drum 30 is vertically oriented with its rotational axis 32 in a horizontal plane. The drum 30 is adapted for rotation by means of, for example, a driven shaft 34 connected to the drum 30 coaxially with the rotational axis 32. The driven shaft 34 can be drivingly connected to a motor (not shown), and is preferably driven at a constant angular velocity. A plurality of filter tow receiving channels 36 are formed in the outer periphery of the drum 30 and are preferably in equally spaced apart relationship around the perimeter of the drum 30. The filter tow receiving channels 36 are open to the outer periphery of the drum 30 and are oriented with their longitudinal axis generally parallel to the axis of rotation of the drum 30. As can be best seen in FIG. 3, the channels 30 are illustrated as being generally tear drop shaped in transverse cross-section.

As shown, filter tow dispensing means, such as a hopper 38 is located adjacent to the outer peripheral surface of the drum 30 at the apex of the drum 30 for depositing filter tows 26 one at a time into the filter tow channels 36 as they sequentially move beneath the hopper 38. The cross-sectional tear drop configuration of the filter tow receiving channels 36 provides a ramp surface down which the filter tows 26 will roll into the deepest portion of the channels 36. This configuration facilitates dispensing the tows 26 into the channels 36 for the reason that each channel 36 need not be exactly positioned beneath the hopper 38 in order to receive a tow 26.

Figure 5:
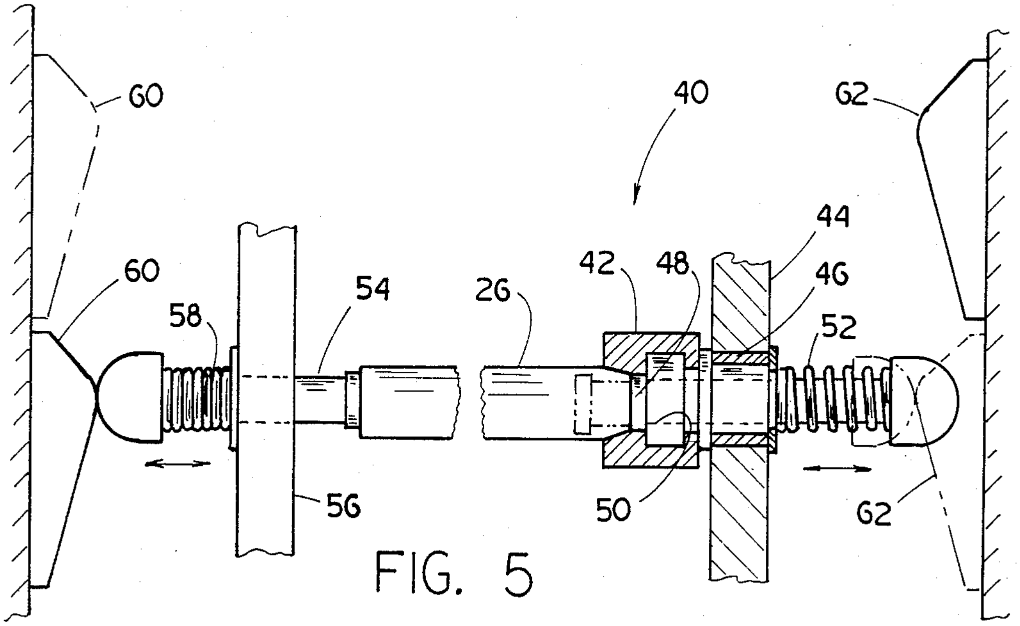
FIG. 5 is an enlarged cross-sectional view of a component of the apparatus of FIGS. 3 and 4; and, FIG. 6 is an enlarged view of another component of the apparatus of FIGS. 3 and 4.
Figure 6:
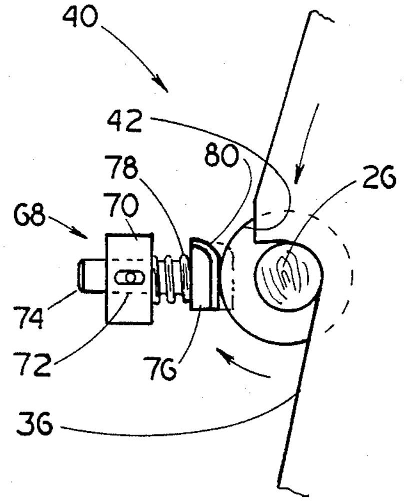

With particular reference to FIGS. 3, 4 and 5, the apparatus 28 further includes means for selectively indexing each of the filter rods located in the channels 36 through a predetermined angle of rotation about the longitudinal axis of the filter rod. The predetermined indexed angle corresponds to the angular displacement between adjacent grooves 18A to be formed in the peripheral surface of the filter tow 26. As can be best seen in FIGS. 4–6, the indexing means comprises a plurality of filter tow indexing devices 40 affixed to the drum 30 for rotation with the drum. The number of indexing devices 40 is equal to the number of filter tow receiving channels 36, with a different one of the indexing devices 40 associated with each of the channels 36. Each indexing device 40 comprises a rotatable chuck 42 located to one side of the drum 30 and attached to the drum 30 by means of a bracket 44 in alignment with the filter tow receiving channel 36 for receiving one end of the filter tow 26 located in the channel 36. The chuck 42 is journalled in the bracket 44 by means of a bearing 46 so that the chuck 42 can rotate about its central axis. The chuck 42 further includes a filter rod ejector pin 48 coaxially located with the chuck 42 and mounted thereto through an aperture 50 for longitudinal movement into and out of the chuck 42. As shown, the ejector pin 48 is biased in a direction out of the chuck 42 by, for example, a compression spring 52 located between the bracket 44 and the head of the ejector pin 48 extending to the opposite side of the bracket 44 from the chuck 42. The indexing device 40 further includes a filter tow chucking pin 54 located to the other side of the drum 30 from the chuck 42 and attached to the drum 30, by means of a bracket 56, in longitudinal alignment with the filter tow receiving channel 36 for pushing a filter tow longitudinally in the channel 36 into engagement with the chuck 42. As shown, the filter tow chucking pin 54 is coaxially located with the chuck 42 and is mounted to the bracket 56 for longitudinal movement into and out of the channel 36. As illustrated, the chucking pin 54 is biased in a longitudinal direction out of the channel 36 by, for example, a compression spring 58 located between the bracket 56 and the head of the chucking pin 54 extending to the opposite side of the bracket 56 from the channel 36. With reference to FIGS. 3, 4 and 5, the filter tow chucking pin 54 is caused to move longitudinally into the aligned channel 36 in a zone of rotation "C" just downstream, relative to the direction of rotation of the drum 30, from the hopper 38 by, for example, a stationary cam 60. As the drum 30 rotates, the head of successive filter rod chucking pins 54 contact the cam 60 which pushes the chucking pin 54 longitudinally against the biasing force of the spring 58 longitudinally into the channel 36. As the chucking pin 54 moves into the channel, it contacts the end of a filter tow in the channel 36 and pushes the filter tow along the channel 36 forcing the other end of the filter rod into engagement in the chuck 42 located to the other side of the drum 30 from the chucking pin 54. As the drum 30 continues to rotate past the zone "C" the chucking pin 54 successively pass the cam 60, and the biasing force of the compression spring 58 causes the chucking pin 54 to move longitudinally back out of the channel 36. With continued reference to FIGS. 3, 4 and 5, the filter tow ejector pin 48 is caused to move longitudinally into the chuck 42 in a zone "D" downstream, relative to the direction of rotation of the drum 30, from the zone "C" by, for example, a stationary cam 62. As the drum rotates, the head of successive filter rod ejector pins 48 contact the cam 62 which pushes the ejector pin 48 longitudinally against the biasing force of the spring 52 into the chuck 42. As the ejector pin 48 moves into the chuck 42, it contacts the end of the filter rod engaged in the chuck 42 forcing the end of the filter tow out of the chuck 42 in preparation to unloading the filter tow from the groove making apparatus 28. As the drum 30 continues to rotate past the zone "D" the ejector pin 48 passes the cam 62 and the biasing spring 52 causes the ejector pin 48 to move longitudinally out of the chuck 42.

As can be best seen in FIGS. 3 and 4, the groove making apparatus 28 further includes a plurality of groove forming rollers 64 located at preselected positions at the periphery of the drum 30. As shown, there are four groove forming rollers 64 generally equally spaced apart from each other about the margin of the drum 30 between zone "C" and zone "D". The rollers 64 are disposed with their axes of rotation substantially parallel to the axes of rotation of the drum 30 so that the rollers 64 and drum 30 all rotate in substantially the same plane. Each of the rollers 64 has a plurality of groove forming blades 66 equally spaced apart about the periphery of the roller 64 and radially projecting outwardly therefrom. As indicated by the directional arrows in FIG. 3, the rollers 64 all rotate in the same direction, for example, clockwise, and in the opposite direction to that of the drum 30. The R.P.M. ratio between the drum 30 and rollers 64 is such that the grooving blades 66 and the filter tows 26 within channels 36 travel at substantially the same angular velocity. Each groove forming blade 66 is as long as a double length groove 18A to be formed in the filter tow and is generally parallel to the longitudinal axes of the channels 36 of the drum 30. Further, the blades 66 project from the margin of the rollers 64 a sufficient distance so that they will at least partially embed themselves into the wall of the filter tows in the filter tow receiving channels 36 of the drum 30 as the drum moves the filter tows beneath the rollers 64 thereby forming the grooves 18A in the filter tows.

It is foreseeable that the groove forming blades 66 be heated by, for example, electrical resistance heating means if the material of the filter tow 26 has such a high modulus of elasticity that it will not otherwise take a permanent set when the groove forming blades 66 are implanted in the peripheral surface of the filter tows 26.

In order to form the four circumferentially spaced apart grooves in the filter tows in the channels 36, the filter tows must be indexed or rotated about their longitudinal axes through the appropriate angle. As illustrated, in order to form four equally spaced apart grooves 18A in a filter tow, the filter tow 26 must be rotated 90° after each groove is formed therein by a groove forming blade 66 of one roller 64 and before the next groove is formed therein by a blade 66 of the next succeeding roller 64. Toward this end, the chuck 42 engaging one end of the filter tow is caused to rotate through the desired angle, for example, here 90°, thus rotating or indexing the engaged filter tow 26 through the same angle about its longitudinal axis. In order to rotate the chuck 42, the indexing device 40 includes a plurality of stationary chuck contact shoe assemblies 68 adjacent to the outer periphery of the drum 30 and at spaced apart intervals between the above discussed zones "C" and "D". As shown best in FIG. 3, there are three successively located shoe assemblies 68 so that each filter tow is indexed three times, and each time it is indexed through 90°. A different one of the shoe assemblies 68 is located upstream, relative to the direction of rotation of the drum 30, of each of the rollers 64. As can be best seen in FIG. 6, each shoe assembly 68 comprises a mounting bracket 70, attached to appropriate framework (not shown), having a through bore 72. A longitudinally movable shaft 74 is axially received in the bore 72, and a chuck contact shoe 76 is attached to one end of the shaft 74 for movement toward and away from the outer periphery of the drum 30 with the shaft 74. A compression spring 78 is coaxially received over the shaft 74 between the bracket 70 and shoe 76 to bias the shoe 76 toward the outer periphery of the drum 30. The shoe 76 includes a friction sole 80 which contacts the periphery of the chuck 42 as the drum 30 rotates causing the chuck 42 to rotate in its journal 46. The rotation of the chuck 42 indexes the filter tow engaged therein, as discussed above, in preparation for following grooving operations.

The groove making apparatus 28 further includes retaining means, generally denoted as the number 82, for retaining the filter tows in the channels 36 as the drum 30 rotates. The retaining means can include small apertures formed in the walls of the channels 36 operatively connected to a source of vacuum so that the filter tows 26 are held in the channels 36 by suction. As can be best seen in FIG. 3, the retaining means 82 is illustrated as comprising a stationary arcuately shaped band 84 generally concentrically located with the drum and extending around a portion of the outer periphery of the drum 30, in the direction of rotation of the drum 30, from the hopper 38 to a location downstream of the zone "D" discussed above. The band 84 is a narrow strip located at the end of the channels 36 opposite from the chucks 42. The terminating end 86 of the band 84 downstream of the zone "D" defines the filter tow unloading station of the groove making apparatus 28. The band 84 is spaced radially from the outer periphery of the drum 30 by a distance less than the diameter of the filter tow. More particularly, the band 84 is spaced from the bottom of the filter tow receiving channels 36 by a distance slightly larger than the diameter of a filter tow so that the band 84 will prevent the filter tow from falling out of the channel 36 as the drum 30 rotates, but will allow the filter tows to index about their longitudinal axes in the channels 36. A filter tow ejecting station for removing grooved filter tows from the channels 36 is defined by the terminal end 86 of the band 84. As the channels 36 reach the terminal end 86 of the band 84, the filter tows fall out of the channels 36 under the influence of gravity. As shown, a chute 88 is located at the terminal end 86 of the band 84 to convey the filter tows falling from the drum 30 away from the apparatus 28. After the filter tows 26 leave the apparatus 28 they are cut into individual filters 18 as discussed above.

In the appended claims, the term filter rod is used in a generic sense to cover individual filter rods or filter tows from which individual filter rods are cut as discussed above in relationship to FIGS. 1–2.

The foregoing detailed description is given primarily for clearness of understanding and no unnecessary limitations should be understood therefrom for modifications will become obvious to those skilled in the art upon reading this disclosure and can be made without departing from the spirit of the invention or scope of the appended claims.

What is claimed is:

1. An apparatus for making elongated grooves in the peripheral surface of a filter rod, comprising:

a generally cylindrical, rotatably drum;

means defining a plurality of filter rod receiving channels in the peripheral surface of the drum, the filter rod receiving channels being open to the peripheral surface of the drum, the longitudinal axes of the channels being parallel to the rotational axis of the drum;

means located adjacent to the periphery of the drum for successively forming a plurality of circumferentially spaced apart grooves in the peripheral surface of the filter rods disposed in the channels; and, means for indexing filter rods in selected ones of the channels about the longitudinal axes of the filter rods to position the filter rods for succeeding groove formation by the groove forming means.

2. The groove making apparatus of claim 1, further comprising means for retaining the filter rods in the channels as the drum rotates through at least a portion of one revolution.

3. The groove making apparatus of claim 2, wherein the filter rod retaining means comprises an arcuate band generally concentrically located with the drum and spaced from the periphery of the drum by a distance less than the diameter of a filter tow.

4. The groove making apparatus of claim 1, wherein the means for successively forming a plurality of grooves in the filter rod comprises:

at least one groove forming roller located at the periphery of the drum, the roller being disposed with its axis of rotation generally parallel to the axes of rotation of the drum; and, at least one groove forming blade projecting generally radially outwardly of the groove forming roller and adapted to embed in a filter rod as the drum conveys the filter rod past the roller.

5. The groove making apparatus of claim 4, comprising a plurality of rollers spaced apart around at least a portion of the periphery of the drum.

6. The groove making apparatus of claim 5, wherein the number of groove forming rollers equals the number of grooves to be formed in each filter rod and each roller forms one groove in each filter rod.

7. The groove making apparatus of claim 1, further comprising:

filter rod dispensing means for depositing filter rods into the filter rod receiving channels; and, a filter rod ejection station for removing grooved filter rods from the filter rod receiving channels located at the periphery of the drum at a predetermined distance around the periphery of the drum from the filter rod dispensing means.

8. The groove making apparatus of claim 7, further comprising means for retaining the filter rods in the channels as the drum rotates generally between the filter rod dispensing means and the filter rod ejection station.

9. The groove making apparatus of claim 7, wherein the groove forming rollers are located between the filter rod dispensing means and filter rod ejection station and are equally spaced apart from each other.

10. The groove making apparatus of claim 1, wherein the filter rod receiving channels are generally tear drop shaped in transverse cross-section.

11. The groove making apparatus of claim 1, wherein the filter rod indexing means comprises chuck means for engaging at least one end of the filter rods in the channels.

12. The groove making apparatus of claim 11, wherein the chuck means are associated with the drum means for rotation therewith.

13. The groove making apparatus of claim 12, wherein the chuck means is associated with each of the filter rod receiving channels.

14. The groove making apparatus of claim 11, wherein the filter rod indexing means further comprises means for rotating selected chuck means through a predetermined angle about the axis of the chuck means.

15. The groove making apparatus of claim 14, wherein the means for rotating selected chuck means are located at the perimeter of the drum and are stationary.

16. The groove making apparatus of claim 11, wherein the filter rod indexing means further comprises means for forcing the filter rods in the channels into engagement with the chuck means.

17. The groove making apparatus of claim 11, wherein the indexing means comprises ejector means for ejecting grooved filter rods from the chuck means.

18. The groove making apparatus of claim 1, wherein:

the groove forming means comprises a plurality of rollers spaced apart about at least a portion of the periphery of the drum, each roller including at least one groove forming blade adapted to embed in a filter rod as the drum conveys the filter rod past the rollers; and, the means for indexing the filter rods are located between successively located groove forming rollers.

19. The groove making apparatus of claim 18, wherein the number of groove indexing means is one less than the number of groove forming rollers.

20. The groove making apparatus of claim 1, wherein the drum is continuously rotated at a substantially contant angular velocity.

21. The groove making apparatus of claim 4, wherein the groove forming roller is continuously rotated at a substantially constant angular velocity.

* * * * *